United States Patent
Petit et al.

(10) Patent No.: US 11,478,873 B2
(45) Date of Patent: Oct. 25, 2022

(54) METHOD FOR WELDING USING POINTS OF MARTENSITIC STAINLESS STEEL SHEETS

(71) Applicant: APERAM, Luxembourg (LU)

(72) Inventors: Bertrand Petit, Auchel (FR); Frédéric Bridault, Racquinghem (FR)

(73) Assignee: APERAM, Luxembourg (LU)

( * ) Notice: Subject to any disclaimer, the term of this patent is extended or adjusted under 35 U.S.C. 154(b) by 266 days.

(21) Appl. No.: 16/626,975

(22) PCT Filed: Jun. 30, 2017

(86) PCT No.: PCT/IB2017/053975
§ 371 (c)(1),
(2) Date: Dec. 27, 2019

(87) PCT Pub. No.: WO2019/002924
PCT Pub. Date: Jan. 3, 2019

(65) Prior Publication Data
US 2020/0223008 A1    Jul. 16, 2020

(51) Int. Cl.
*B23K 11/16*    (2006.01)
*B23K 11/11*    (2006.01)
(Continued)

(52) U.S. Cl.
CPC .............. *B23K 11/16* (2013.01); *B23K 11/115* (2013.01); *C22C 38/04* (2013.01); *C22C 38/26* (2013.01);
(Continued)

(58) Field of Classification Search
CPC ... B23K 11/16; B23K 11/115; B23K 2101/18; B23K 2103/05; B23K 2101/006;
(Continued)

(56) References Cited

U.S. PATENT DOCUMENTS

| 4,594,115 A | * | 6/1986 | Lacoude | ................. C22C 38/18 |
| | | | | 148/542 |
| 11,001,916 B2 | * | 5/2021 | Santacreu | ............. C22C 38/002 |

(Continued)

FOREIGN PATENT DOCUMENTS

| CA | 2909397 A1 | 10/2014 |
| CN | 101142337 A | 3/2008 |

(Continued)

OTHER PUBLICATIONS (International Search Report) Rapport De Recherche International issued in corresponding International Patent Application No. PCT/IB2017/053975 dated Oct. 27, 2017, in French.

(Continued)

*Primary Examiner* — John J Norton
*Assistant Examiner* — Simpson A Chen
(74) *Attorney, Agent, or Firm* — Troutman Pepper Hamilton Sanders LLP

(57) ABSTRACT

Method for welding two stainless steel sheets of thickness (e) 0.10 to 6.0 mm and having a particular composition having: a first welding step lasting a time (t) in ms: 0.10 to 0.50 mm, t=(40×e+36)±10%; 0.51 to 1.50 mm: t=(124×e 13)±10%; 1.51 to 6.0 mm: t=(12×e+47)±10%; with clamping force (F) in daN: 0.10 to 1.50 mm: F=(250×e+90)±10%; 1.51 mm to 6.0 mm: F=(180×e+150)±10%; appling a current between the welding electrodes, of intensity between 80 and 100% the maximum permissible intensity corresponding to expulsion of molten metal; a second step with an intensity between zero and 1 kA; and a third step with an intensity of 3.5 kA to 4.5 kA, for a time of at least 755 ms.

9 Claims, 3 Drawing Sheets

(51) Int. Cl.
   *C22C 38/04*  (2006.01)
   *C22C 38/26*  (2006.01)
   *C22C 38/48*  (2006.01)
   *C22C 38/58*  (2006.01)
   *B23K 101/18*  (2006.01)
   *B23K 103/04*  (2006.01)
   *B23K 101/00*  (2006.01)
   *C22C 38/18*  (2006.01)
   *C22C 38/40*  (2006.01)

(52) U.S. Cl.
   CPC .............. *C22C 38/48* (2013.01); *C22C 38/58* (2013.01); *B23K 2101/006* (2018.08); *B23K 2101/18* (2018.08); *B23K 2103/05* (2018.08); *C22C 38/18* (2013.01); *C22C 38/40* (2013.01)

(58) Field of Classification Search
   CPC ......... C22C 38/04; C22C 38/26; C22C 38/48; C22C 38/58
   USPC ...................................... 219/86.31
   See application file for complete search history.

(56) References Cited

U.S. PATENT DOCUMENTS

| | | | | |
|---|---|---|---|---|
| 2010/0122968 A1* | 5/2010 | Buse | ..................... | B23K 11/257 219/108 |
| 2012/0141829 A1* | 6/2012 | Oikawa | .................. | B23K 11/16 219/118 |
| 2015/0174690 A1* | 6/2015 | Furusako | ............. | B23K 11/241 219/91.22 |
| 2016/0082543 A1* | 3/2016 | Wakabayashi | ......... | B23K 11/16 219/86.31 |
| 2019/0240768 A1* | 8/2019 | Furusako | ............. | B23K 11/257 |

FOREIGN PATENT DOCUMENTS

| | | |
|---|---|---|
| CN | 102794538 A | 11/2012 |
| CN | 104245211 A | 12/2014 |
| CN | 106255566 A | 12/2016 |
| EP | 0 170 598 A1 | 2/1985 |
| EP | 2 987 581 A1 | 2/2016 |
| EP | 3366408 A1 | 8/2018 |
| JP | 61-019734 A | 1/1986 |
| JP | 2010-539325 A | 12/2010 |
| JP | 2015-101789 A | 6/2015 |
| WO | 2016/170397 A1 | 10/2015 |
| WO | 2017/069268 A1 | 4/2017 |
| WO | 2017/182896 A1 | 10/2017 |

OTHER PUBLICATIONS (Written Opinion) Opinion Écrite De L'administration Chargé De La Recherche Internationale issued in corresponding International Patent Application No. PCT/IB2017/053975, in French.

Badheka, V. J., et al., "Resistance Spot Welding of Martensitic Stainless Steep (SS420)—Part I", International Journal of Mechanical and Materials Engineering (IJMME), 4(3):328-340, Dec. 31, 2009.

\* cited by examiner

METHOD FOR WELDING USING POINTS OF MARTENSITIC STAINLESS STEEL SHEETS

CROSS REFERENCE TO RELATED APPLICATION

This is a U.S. National Phase Application under 35 U.S.C. § 371 of International Patent Application No. PCT/IB2017/053975, filed Jun. 30, 2017. The entire contents of which are hereby incorporated by reference.

FIELD OF THE INVENTION

The present invention relates to the steel industry and more particularly to methods for the spot welding of steel sheet.

BACKGROUND

Hot-worked martensitic stainless-steel sheets are known with adjustments to composition, to initial microstructure and to heat treatment parameters which have allowed the obtaining of strong mechanical characteristics and large capacity for complex forming. Said sheets are described in document PCT/IB2017/051636 (published as WO 2017/182896) to the Applicant and are chiefly intended for the automotive industry.

SUMMARY

Their composition is the following, in weight percent:
0.005%≤C≤0.3%;
0.2%≤Mn≤2.0%;
traces≤Si≤1.0%;
traces≤S≤0.01%;
traces≤P≤0.04%;
10.5%≤Cr≤17.0%; preferably 10.5%≤Cr≤14.0%;
traces≤Ni≤4.0%;
traces≤Mo≤2.0%;
Mo+2×W≤2.0%;
traces≤Cu≤3%; preferably traces≤Cu≤0.5%;
traces≤Ti≤0.5%;
traces≤Al≤0.2%
traces≤O≤0.04%;
0.05%≤Nb≤1.0%
0.05%≤Nb+Ta≤1.0%;
0.25%≤(Nb+Ta)/(C+N)≤8;
traces≤V≤0.3%;
traces≤Co≤0.5%;
traces≤Cu+Ni+Co≤5.0%;
traces≤Sn≤0.05%;
traces≤B≤0.1%;
traces≤Zr≤0.5%;
Ti+V+Zr≤0.5%;
traces≤H≤5 ppm, preferably traces≤H≤1 ppm;
traces≤N≤0.2%;
(Mn+Ni)≥(Cr−10.3−80×[(C+N)$^2$]);
traces≤Ca≤0.002%;
traces≤rare earths and/or Y≤0.06%;
the remainder being iron and processing impurities;
the start temperature (Ms) of martensitic transformation of the sheet being ≥200° C.;
and the finish temperature (Mf) of martensitic transformation of the sheet being ≥−50° C.

The microstructure of the initial sheet obtained after using appropriate means possibly including hot and/or cold working, is composed of tempered ferrite and/or martensite and 0.5% to 5 volume % of carbides, and the ferritic grain size is from 1 to 80 µm, preferably 5 to 40 µm. The thickness of this initial sheet is from 0.1 to 10 mm and more typically 0.1 mm to 6 mm.

The treatment process typically applied thereto starts with austenization of the sheet i.e. a rise in temperature above the Ac1 temperature of the steel to form austenite in lieu and stead of the ferrite and carbides of which the starting microstructure was composed, and under conditions limiting as much as is possible decarburization and surface oxidation of the sheet. Typically, there subsists no more than 20% residual ferrite and no more than 0.5% carbides.

Several successive hot-forming steps of the sheet are then performed (at least two) under conditions of time and temperature so that the structure of low ferrite and carbide content obtained after austenization is maintained throughout the entire forming process. These hot-forming operations take place at a temperature higher than the start temperature Ms of martensitic transformation. If needed, it is possible to reheat or to maintain temperature between or during each hot-forming operation by means of heating equipment, so that the temperature of the sheet during forming and between forming operations (during transfers of the sheet from one tooling to another, or if the sheet remains on the same tooling, during changes of configuration of the tooling) does not drop below Ms.

It is to be understood that by the term «hot-forming step» it is meant to include deformation or material removal operations as varied for example as deep-drawing, hot drawing, drop forging, cutting, piercing, these steps possibly taking place in any order chosen by the manufacturer.

After hot-forming, the part obtained is cooled with no particular restrictions as to the conditions for cooling.

At the time of cooling, a cutting step or final hot-forming step can be performed between Ms and Mf (finish temperature of martensitic transformation) under conditions in which the microstructure is composed of at least 10% austenite and no more than 20% ferrite, the remainder being martensite.

The sheet thus obtained has strong mechanical properties at ambient temperature in particular due to the high martensite content. Typically, the tensile strength Rm is at least 1000 MPa, the yield strength Re is at least 800 MPa, percentage elongation after fracture A measured as per standard ISO 6892 is at least 8%, and the bending angle for a thickness of 1.5 mm is at least 60°, measured as per standard VDA 238-100. This implies that the sheet finally obtained has excellent formability and can be given particular use in the automotive industry or to form parts having a structural function in aeronautics, the building or railway industries.

Finally, after cooling down to ambient temperature following after the last forming operation, the microstructure of the sheet contains a volume fraction of no more than 0.5% carbides and a volume fraction of no more than 20% residual ferrite, the remainder being martensite.

Such sheet having a typical thickness of 0.10 to 6.0 mm has a shortcoming, which is that the weldability thereof can sometimes be considered insufficient when welding is performed using a spot welding method under the most frequent conditions used by vehicle manufacturers. It is found that, in weld zones, it is not easy to obtain a crosshead tensile strength that is sufficient for a given thickness of the sheet (i.e. typically of at least 450 daN for sheet having a thickness of 1.2 mm): the material is too weak at the weld.

It has been possible to improve results by modifying the weld parameters i.e. by adding post-heating pulses to standard weld cycles, as usually used with martensitic steels, but up until now the optimisations carried out have not allowed satisfactory weld quality to be obtained for weld cycles lasting less than 5 s. This time length is much too high for vehicle manufacturers who must be able to weld these sheets paying heed to the productivity restrictions they face for application to the mass production of vehicles. A total weld cycle time of no more than about 1 s would be their target. A weld cycle lasting a total time of 1.5 s, even 2 s, could sometimes be acceptable.

It is therefore the objective of the invention to propose a spot welding cycle especially adapted to the use of the previously described martensitic stainless-steel sheet for hot drawing, and which allows this welding to be carried out under industrially suitable conditions for the automotive sector.

For this purpose, the subject of the invention is a method for welding two stainless-steel sheets having a thickness of 0.10 to 6.0 mm, and having the following composition in weight percent:

0.005%≤C≤0.3%;
0.2%≤Mn≤2.0%;
traces≤Si≤1.0%;
traces≤S≤0.01%;
traces≤P≤0.04%;
10.5%≤Cr≤17.0%; preferably 10.5%≤Cr≤14.0%;
traces≤Ni≤4.0%;
traces≤Mo≤2.0%;
Mo+2×W≤2.0%;
traces≤Cu≤3%; preferably traces≤Cu≤0.5%;
traces≤Ti≤0.5%;
traces≤Al≤0.2%;
traces≤O≤0.04%;
0.05%≤Nb≤1.0%;
0.05%≤Nb+Ta≤1.0%;
0.25%≤(Nb+Ta)/(C+N)≤8;
traces≤V≤0.3%;
traces≤Co≤0.5%;
traces≤Cu+Ni+Co≤5.0%;
traces≤Sn≤0.05%;
traces≤B≤0.1%;
traces≤Zr≤0.5%;
Ti+V+Zr≤0.5%;
traces≤H≤5 ppm, preferably traces≤H≤1 ppm
traces≤N≤0.2%;
(Mn+Ni)≥(Cr−10.3−80×[(C+N)$^2$]);
traces≤Ca≤0.002%;
traces≤rare earths and/or Y≤0.06%;
the remainder being iron and processing impurities;
the start temperature (Ms) of martensitic transformation of the sheet being ≥200° C.;
the finish temperature (Mf) of martensitic transformation of the sheet being −50° C.;
the microstructure of the sheet containing no more than a volume fraction of 0.5% carbides, and no more than a volume fraction of 20% residual ferrite, the remainder being martensite;
characterized in that it comprises the following steps, (e) being the thickness of each of said sheets or the thinnest amongst them:
A first welding step, lasting a time (t) in ms:
for thicknesses (e) of 0.10 to 0.50 mm:

$t=(40×e+36)±10\%$, for thicknesses (e) of 0.51 to 1.50 mm:

$t=(124×e−13)±10\%$, for thicknesses (e) of 1.51 to 6.0 mm:

$t=(12×e+47)±10\%$, and with a clamping force (F) in daN:
for thicknesses (e) of 0.10 to 1.50 mm:

$F=(250×e+90)±10\%$, for thicknesses (e) of 1.51 mm to 6.0 mm:

$F=(180×e+150)±10\%$, at this step a current is applied between the welding electrodes, having an intensity of between 80 and 100% the maximum permissible intensity corresponding to expulsion of molten metal;
A second step at which the intensity of the current is set at between zero and 1 kA,
And a third step at which the passing of current is resumed at an intensity of 3.5 kA to 4.5 kA, for a time of a least 755 ms, to apply heat treatment to the weld zone.

Preferably, at the second step, the passing of current is interrupted in the weld zone.

Advantageously, the sum of the times of said first, second and third steps is no more than 2 s, preferably no more than 1.5 s, better still no more than 1 s.

Said sheets can be hot rolled sheets.

As will have been understood, in the invention the sheets having priority consideration and having the composition specified above are subjected to a cycle of spot welding that is particular in the choice of parameters and particular in its sequence of operations.

It is recalled that the conditions for performing spot welding are sufficiently defined by:
the pressure applied by the welding electrodes on the parts to be welded, which impacts contact resistance together with chemical composition and surface roughness of the parts;
the intensity of the current passing through the zone to be welded, and which is subjected to a regulated current supply, as a function of the other parameters that are not strictly controllable;
welding time or the time of the different steps thereof.

Therefore, the difference in potential between the two sheets varies according to contact resistance and consequently according to the energy injected into the weld area. This difference in potential and this power do not themselves directly represent the parameters of the method, but they nevertheless come to be applied on account of controllable and controlled operating conditions represented by clamping force and current intensity Welding starts with a first step at which an electrical current of regulated intensity is passed through the sheets to be welded, previously placed in contact with each other under a force. The force to be applied and current time are usually dictated by the standard the user wishes to apply (e.g. SEP1220, or ISO18278-2). Once these two parameters have been selected and applied, the user varies the welding current until expulsion of molten metal which represents the maximum intensity value within the weldability range. The weld current intensity of the invention lies in a range of between 80% and 100% of this maximum intensity. Typically, in the invention this weld current intensity is 5.5 kA when the sheets to be welded have a thickness of 1.2 mm.

In general, the maximum tolerable welding intensity corresponding to expulsion of molten metal is obtained experimentally with a standardized method, see for example standards SEP 1220 and ISO 18278-2. The determination thereof by persons skilled in the art, in each particular case that arises to implement the invention, must therefore be carried out when finalising the specific welding process of the invention. However, this determination is not typical of the invention and, similarly, the issue of optimising weld current intensity can be encountered when implementing any spot welding method and is conventionally performed as described.

The force F in daN for thicknesses e of 0.1 mm to 1.50 mm is expressed by the equation:

$$F=250 \times e+90$$

and for thicknesses of 1.51 mm to 6 mm by the equation:

$$F=180 \times e+150$$

e being the thickness of the two welded sheets, or of the thinnest from amongst these if they are of different thickness.

A variation in force F of ±10% around these expressed values is permissible.

The weld time tin ms is also expressed for the thicknesses of 0.10 to 0.50 mm by the equation:

$$t=40 \times e+36$$

for thicknesses of 0.51 to 1.50 mm:

$$t=124 \times e-13$$

and for thicknesses of 1.51 to 6.0 mm $$t=12 \times e+47$$

A variation of ±10% around these expressed values is permissible.

At a second step, the pressure of the electrodes is maintained and the passing of current is stopped or strongly reduced, and an intensity of no more than 1 kA is applied and ideally of 0 kA, for a minimum time tf expressed in ms by the equation:

$$tf \geq 34 \times e+2$$

This leads to sudden cooling of the sheets in the weld zone down to a temperature positioned between Ac1 and Ac5, a temperature range leading to re-austenization of the zone.

At a third step, the electrical current is resumed at an intensity value of between 3.5 and 4.5 kA, to maintain the temperature between Ac1 and Ac5 and to apply heat treatment to the weld zone, which will modify the structural characteristics thereof imparting desired mechanical properties thereto. This third step must last a time of at least 755 ms for ensured efficacy, and no maximum time is specified. The longer it is, the more the heat treatment will be efficient ensuring high crosshead tensile strength. However, it is of advantage to avoid excessively lengthening this third step so as not to lengthen the weld cycle by a length that would be incompatible with the requirements of industrial production. Advantageously, as said above, it is preferable that the total time of the three weld cycle steps does not exceed 2 s, preferably does not exceed 1.5 s, and optimally does not exceed 1 s.

If this treatment is carried out under the described conditions, a crosshead tensile strength can be obtained reaching adequate values for the sheet thicknesses under consideration, even exceeding these values, and with a weld cycle time of approximately 1 s, even shorter, and hence compatible with current industrial requisites in the automotive sector for the mass production of vehicles. It is therefore possible, under good economic conditions for spot welded sheets, to benefit from the advantages of the method described in PCT/IB2017/051636 (published as WO 2017/182896) relating to the easy obtaining of a complex-shaped part in hot-formed martensitic stainless steel having strong mechanical properties and of well-defined composition.

BRIEF DESCRIPTION OF THE DRAWINGS

The invention will be better understood on reading the following description given with reference to the following appended Figures.

DETAILED DESCRIPTION

Experiments conducted by the inventors on the welding of two sheets having the following composition in weight percent: Cr=11.02%; Nb=0.11%; Mn=0.50%; C=0.059%; N=0.0107%; the remainder being iron and processing impurities, in the austenitized state and press-quenched, therefore complying with the invention described in PCT/IB2016/052302, and of thickness of 1.2 mm, gave the following results.

Figure 1:
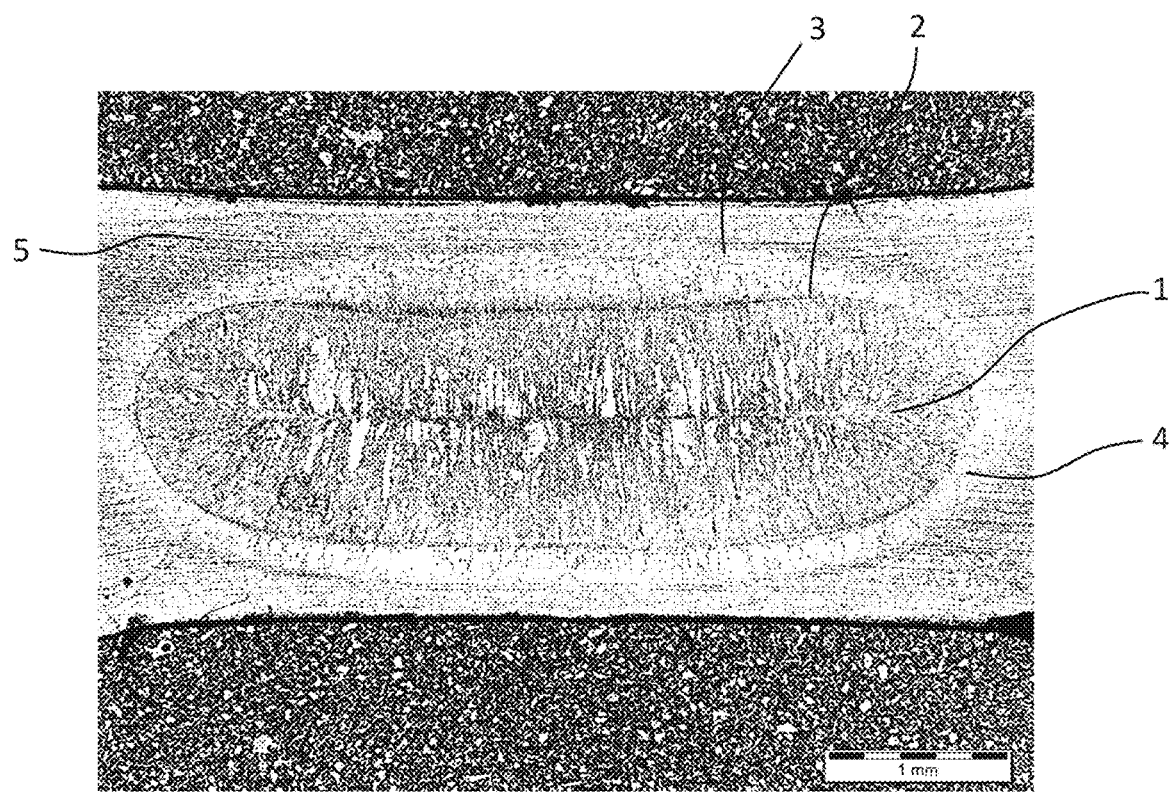
FIG. 1 gives a micrograph of the weld zone when two sheets are welded together with a method not conforming to the invention.
Figure 2:
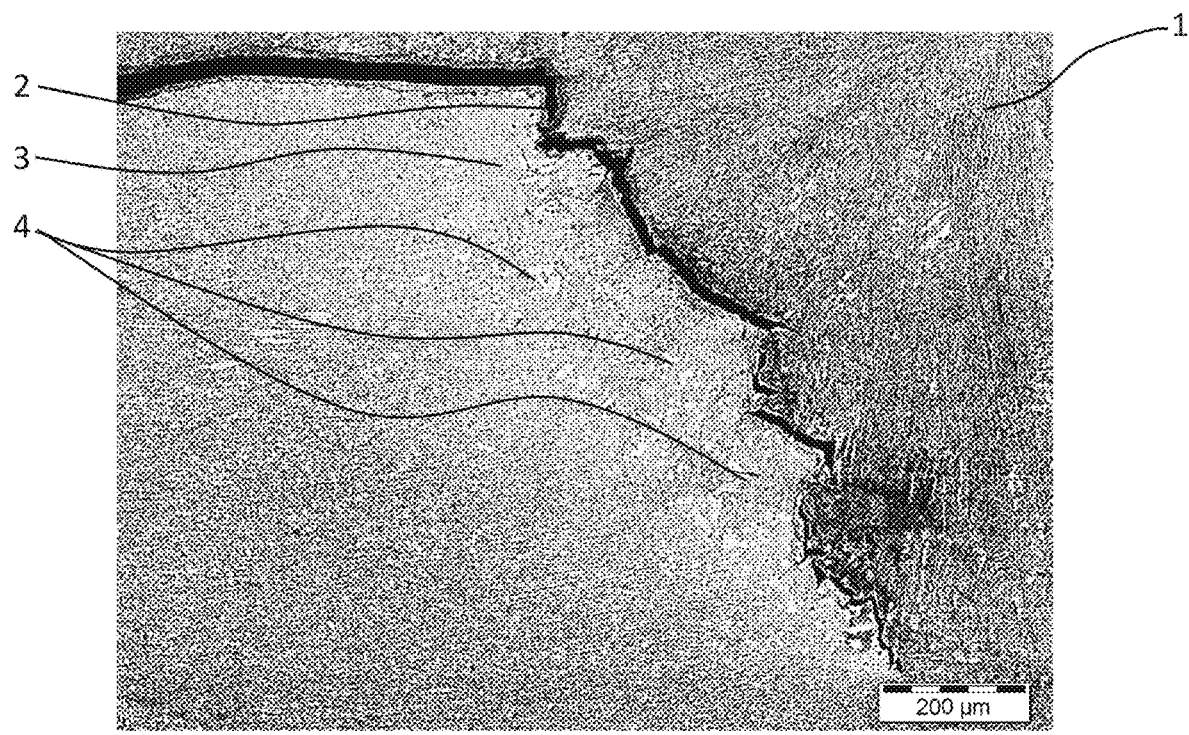
FIG. 2 shows one detail of the weld zone in FIG. 1.

In a first series of experiments, a conventional weld cycle was applied lasting a total time of 560 ms, wherein between the electrodes under a pressure of 4000 N a current was passed of intensity of 5.5 kA for 280 ms, followed by a zero-intensity period of 280 ms during which the pressure was maintained (parameters laid down by standard ISO 18278-2 and usually used by vehicle manufacturers). The results are given in FIG. 1 and FIG. 2 showing micrographs of the weld zone. In the centre of FIG. 1, the presence can be seen of the molten zone 1 corresponding to the actual weld and around it the Heat-Affected Zone—HAZ. The molten zone 1 is bordered by a crack 2 propagating inside the HAZ 3 of large grain size inside which the ferrite 4 can be seen in white (also clearly visible in FIG. 1). It is this fragile ferrite 4 which is responsible for propagation of the crack 2, and hence for the poor crosshead tensile strength. The proportion of ferrite in the HAZ 3 is 20 to 80% depending on areas, which is distinctly higher than could be expected from reading of the equilibrium diagrams. The measured crosshead tensile strength is 290 daN, therefore largely insufficient for the needs of vehicle manufacturers for example.

Reductions in current application time (from 280 ms to 140 ms) were beneficial in that they allowed a reduction in the extent of the HAZ 3 of large grain size, and a decrease in the percentage of residual ferrite without significantly modifying the molten zone 1. However, the HAZ 3 still contains a quantity of fragile ferrite and crosshead tensile strength is not sufficiently improved.

In a second series of experiments according to the invention, after a first step that was the same as in the preceding experiments, the passing of current was interrupted for 46 ms whilst maintaining the pressure of the electrodes. And a third step was added to the preceding experiment, at which the passing of current was resumed at an intensity of 4 kA for a time of 814 ms, to apply heat treatment to the weld zone.

Overall, the cycle in the example of the invention lasted 140+46+814=1000 ms. The objective is to obtain a weld of the two parts that does not exhibit a weak assembly point, in other words the crosshead tensile strength at the weld zone must be sufficient to meet this objective, and to obtain this weld within a total cycle time which ensures satisfactory plant productivity under industrial conditions. Typically, a weld cycle time of approximately 1 s, as in the described example, is a said satisfactory result for the mass production of welded sheet in the automotive industry.

Figure 3:
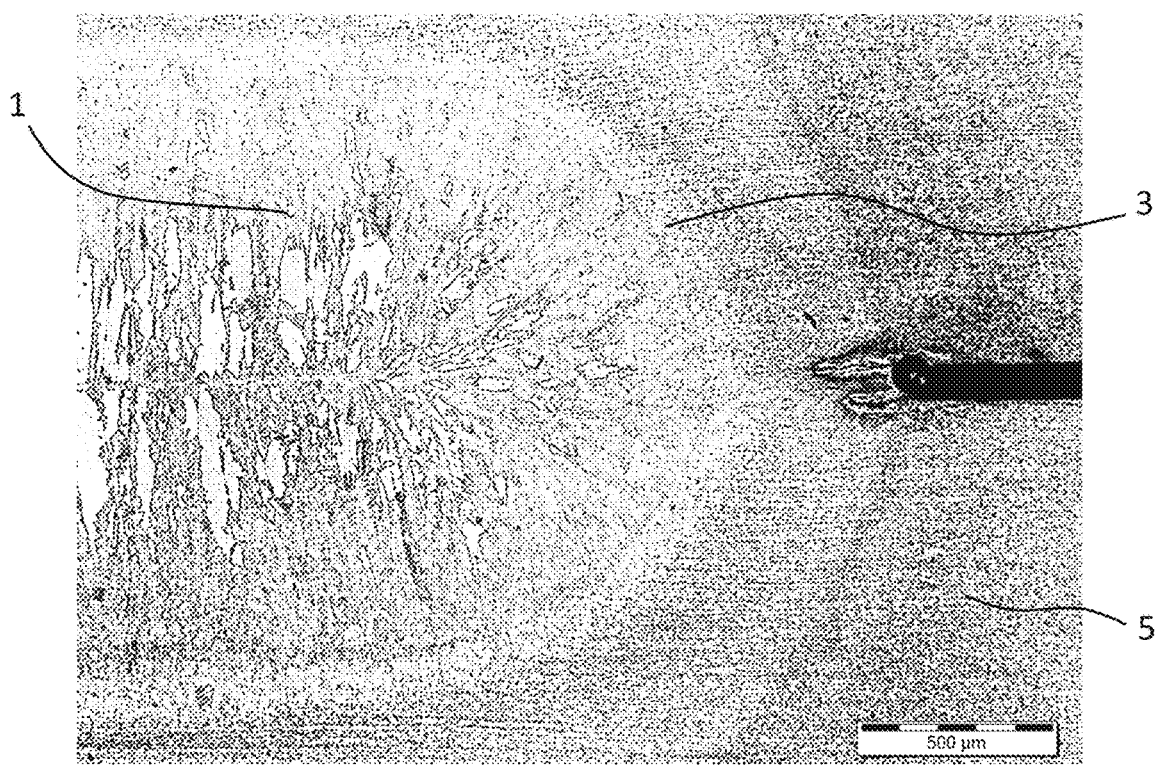
FIG. 3 gives a micrograph of the weld zone after the second step of a method of the invention, therefore in an intermediate state preceding the third welding step, and showing the disappearance of residual ferrite at this stage.
Figure 4:
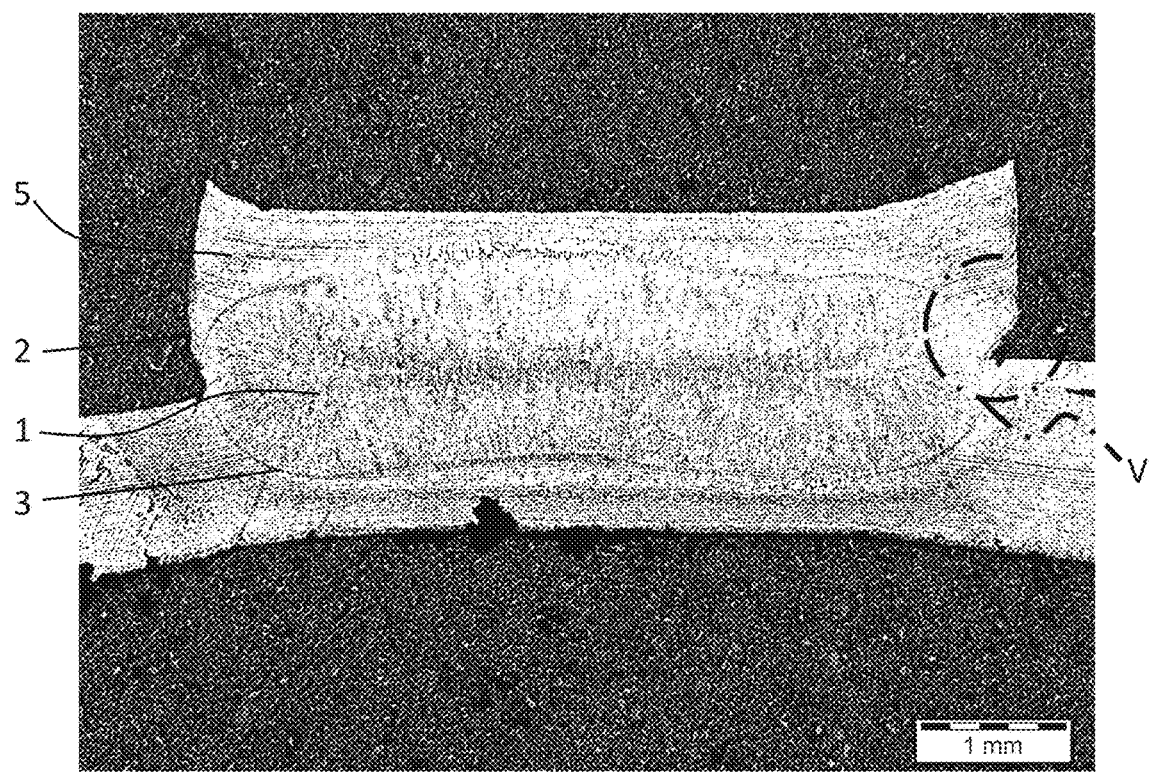
FIG. 4 gives a micrograph of the weld zone after complete implementation of a method conforming to the invention.
Figure 5:
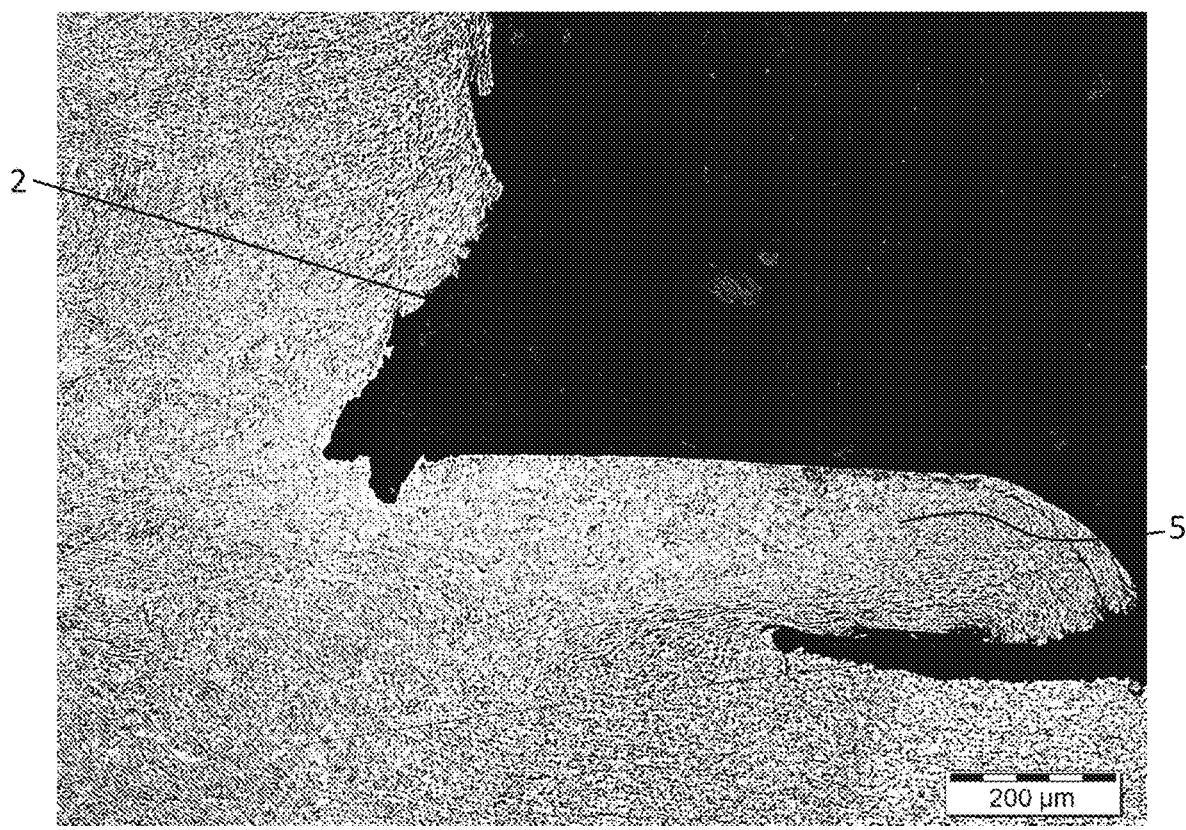
FIG. 5 shows a detail of the weld zone in FIG. 4.

FIG. 3 shows the appearance of the weld zone able to be obtained with the invention after the second step of the method of the invention which only lasted 46 ms. FIG. 4 and FIG. 5 show the weld zone after implementing the entirety of the method of the invention. The large grains in the HAZ 3 in FIG. 4 have not only disappeared but the toughness of the HAZ 3 and of the molten zone 1 is such that the crack 2, the trace of which can be seen in FIG. 5, is deflected into the base metal 5.

In this manner, a crosshead tensile strength higher than 450 daN is obtained at the weld bead, which is the objective that had been set in the described example, having regard to the thickness of the sheets to be welded.

The inventors attribute the advantage of the method of the invention, compared with more conventional spot-welding methods, to the sum of the following factors which appears to have a remarkable synergic effect that was unexpected.

The implementing of a first rapid weld cycle allows a reduction in the residence time above point Ac5 and minimised dividing of gammagenic and alphagenic elements leading to the formation of large grain ferrite in the HAZ 3. It is therefore found that the ferrite 4 in white in FIG. 1 has fully disappeared from the HAZ 3 in FIG. 3.

Interrupting the circulation of current at the second step (or at least a drastic reduction in current intensity) causes cooling of the weld zone down to a re-austenization temperature in the region of 900° C.

A third step at which the current is restored with relatively high intensity, although lower than at the first step, brings definitive annihilation of the presence of residual large grain ferrite in the HAZ around the covered zone and the affording of satisfactory mechanical properties (FIG. 4 and FIG. 5). It can also be seen that the cracking 2 in FIG. 4 no longer follows the HAZ as in FIG. 1 but is deflected into the base metal 5 in FIG. 4 leaving a spot of large diameter on one of the two sheets.

The sheets used to implement the invention can be hot or cold rolled. Of importance is first that their composition and microstructure must conform to the foregoing, and secondly that the thickness thereof lies within the range allowing spot welding, therefore typically from 0.10 to 6.0 mm.

The invention claimed is:

1. The method for welding two steel sheets of thickness 0.10 to 6.0 mm and having the following composition in weight percent:

0.005%≤C≤0.3%;
0.2%≤Mn≤2.0%;
traces≤Si≤1.0%;
traces≤S≤0.01%;
traces≤P≤0.04%;
10.5%≤Cr≤17.0%;
traces≤Ni≤4.0%;
traces≤Mo≤2.0%;
Mo+2×W≤2.0%;
traces≤Cu≤3%;
traces≤Ti≤0.5%;
traces≤Al≤0.2%;
traces≤O≤0.04%;
0.05%≤Nb≤1.0%;
0.05%≤Nb+Ta≤1.0%;
0.25%≤(Nb+Ta)/(C+N)≤8%;
traces≤V≤0.3%;
traces≤Co≤0.5%;
traces≤Cu+Ni+Co≤5.0%;
traces≤Sn≤0.05%;
traces≤B≤0.1%;
traces≤Zr≤0.5%;
Ti+V+Zr≤0.5%;
traces≤H≤5 ppm,
traces≤N≤0.2%;
(Mn+Ni)≥(Cr−10.3−80×[(C+N)$^2$]);
traces≤Ca≤0.002%;
traces≤rare earths and/or Y≤0.06%;
the remainder being iron and processing impurities;
the start temperature (Ms) of martensitic transformation of the sheet being ≥200° C.;
the finish temperature (Mf) of martensitic transformation of the sheet being ≥−50° C.;
the microstructure of the sheet containing no more than a 0.5% volume fraction of carbides, and no more than a volume fraction of 20% residual ferrite, the remainder being martensite;
wherein it comprises the following steps, e being the thickness of each of said sheets or of the thinnest amongst them:
a first welding step lasting a time (t) in ms:
the thickness e of each of said sheets or of the thinnest amongst said sheets being between 0.10 and 0.50 mm:
t=(40×e+36)±10%
the thickness e of each of said sheets or of the thinnest amongst said sheets being between 0.51 and 1.50 mm:
t=(124×e−13)±10%
the thickness e of each of said sheets or of the thinnest amongst said sheets being between 1.51 and 6.0 mm:
t=(12×e+47)±10% and with a clamping force F in daN:
the thickness e of each of said sheets or of the thinnest amongst said sheets being between 0.10 and 1.50 mm:
F=(250×e+90)±10%
the thickness e of each of said sheets or of the thinnest amongst said sheets being between 1.51 mm and 6.0 mm:
F=(180×e+150)±10% at this step a current is applied between the welding electrodes, having an intensity of between 80 and 100% the maximum permissible intensity corresponding to expulsion of molten metal;
a second step at which the current intensity is set at between zero and 1 kA;
and a third step at which the passing of current is resumed at an intensity of 3.5 kA to 4.5 kA, for a time of at least 755 ms, to apply heat treatment to the weld zone.

2. The method according to claim 1, wherein at the second step the passing of current is interrupted in the weld zone.

3. The method according to claim 1, wherein said sheets are hot rolled sheets.

4. The method according to claim 1, wherein 10.5%≤Cr≤14.0%.

5. The method according to claim 1, wherein traces≤Cu≤0.5%.

6. The method according to claim 1, wherein traces≤H≤1 ppm.

7. The method according to claim 1, wherein the sum of the times of said first, second and third steps is no more than 2 s.

8. The method according to claim 1, wherein the sum of the times of said first, second and third steps is no more than 1.5 s.

9. The method according to claim 1, wherein the sum of the times of said first, second and third steps is no more than 1 s.

\* \* \* \* \*